(12) United States Patent
Schmidt et al.

(10) Patent No.: US 12,566,150 B2
(45) Date of Patent: Mar. 3, 2026

(54) SENSOR AND DEVICE FOR A SENSOR COMPRISING GEL ELECTROLYTE

(71) Applicant: Mettler-Toledo GmbH, Greifensee (CH)

(72) Inventors: Sebastian Schmidt, Brugg (CH); Davide Aratori, Untersiggenthal (CH)

(73) Assignee: Mettler-Toledo GmbH, Greifensee (CH)

( * ) Notice: Subject to any disclaimer, the term of this patent is extended or adjusted under 35 U.S.C. 154(b) by 237 days.

(21) Appl. No.: 18/376,997

(22) Filed: Oct. 5, 2023

(65) Prior Publication Data

US 2024/0118236 A1 Apr. 11, 2024

(30) Foreign Application Priority Data

Oct. 6, 2022 (EP) ..................................... 22200069
Mar. 16, 2023 (CH) .......................... CH000297/2023

(51) Int. Cl.
| | |
|---|---|
| *G01N 27/40* | (2006.01) |
| *G01N 27/28* | (2006.01) |
| *G01N 27/30* | (2006.01) |
| *G01N 27/407* | (2006.01) |
| *G01N 27/404* | (2006.01) |

(52) U.S. Cl.
CPC ....... *G01N 27/4073* (2013.01); *G01N 27/283* (2013.01); *G01N 27/302* (2013.01); *G01N 27/40* (2013.01); *G01N 27/404* (2013.01)

(58) Field of Classification Search
CPC ............. G01N 27/4073; G01N 27/283; G01N 27/302; G01N 27/40; G01N 27/404; G01N 27/333; G01N 27/4045
See application file for complete search history.

(56) References Cited

U.S. PATENT DOCUMENTS

| | | | | |
|---|---|---|---|---|
| 3,666,650 | A | | 5/1972 | Doniguian |
| 3,837,960 | A | * | 9/1974 | Renn et al. ............. B32B 27/00 |
| | | | | 156/253 |
| 4,367,133 | A | * | 1/1983 | Lauer ..................... G01N 27/48 |
| | | | | 204/414 |
| 4,466,878 | A | * | 8/1984 | DiNitto ................ G01N 27/404 |
| | | | | 204/415 |
| 4,975,175 | A | | 12/1990 | Karube et al. |
| 5,102,525 | A | | 4/1992 | Miyahara et al. |

(Continued)

FOREIGN PATENT DOCUMENTS

| | | |
|---|---|---|
| CN | 114441618 A | 5/2022 |
| DE | 4128494 A1 | 3/1993 |

(Continued)

OTHER PUBLICATIONS

Ghebremedhin et al., "Physics of agarose fluid gels: Rheological properties and microstructure," Current Research in Food Science 4 (2021) 436-448 (Year: 2021).*

*Primary Examiner* — Alexander S Noguerola
(74) *Attorney, Agent, or Firm* — Standley Law Group LLP; Jeffrey S. Standley; Adam J. Smith

(57) ABSTRACT

A sensor for measuring a species in a process medium includes a reinforced membrane, a sensor shaft, and an electrolyte provided between the reinforced membrane and the sensor shaft. The sensor shaft includes electrodes. A device for such a sensor also includes a pre-disposed gel electrolyte. Systems and methods related to the same are also disclosed.

16 Claims, 2 Drawing Sheets

(56)                    References Cited

U.S. PATENT DOCUMENTS

| | | | | |
|---|---|---|---|---|
| 5,281,323 | A | * | 1/1994 | Sugama ............... G01N 27/404 |
| | | | | 204/415 |
| 5,352,352 | A | | 10/1994 | Tsukada et al. |
| 5,397,452 | A | | 3/1995 | Buck et al. |
| 5,725,747 | A | | 3/1998 | Pinkowski et al. |
| 9,506,893 | B2 | | 11/2016 | Wilhelm et al. |
| 2001/0056256 | A1 | * | 12/2001 | Hughes ............... A61M 5/1452 |
| | | | | 604/82 |
| 2009/0120505 | A1 | * | 5/2009 | Brierton .............. A61M 39/223 |
| | | | | 137/68.11 |
| 2016/0258011 | A1 | * | 9/2016 | Waggoner ............ C12Q 1/6869 |
| 2019/0011393 | A1 | | 1/2019 | Fanselow et al. |

FOREIGN PATENT DOCUMENTS

| | | | |
|---|---|---|---|
| DE | 19929264 | A1 | 1/2001 |
| GB | 2162320 | A | 1/1986 |
| JP | 1-223337 | A | 9/1989 |
| WO | 2009/027708 | A2 | 3/2009 |

* cited by examiner

SENSOR AND DEVICE FOR A SENSOR COMPRISING GEL ELECTROLYTE

CROSS-REFERENCE TO RELATED APPLICATIONS

This application claims the benefit of European Patent Application No. 22200069.7 filed Oct. 6, 2022 and Swiss Patent Application No. CH000297/2023 filed Mar. 16, 2023, the disclosures of each of which are hereby incorporated by reference as if fully restated herein.

TECHNICAL FIELD

Exemplary embodiments relate generally to sensors and devices for sensors comprising gel electrolyte

BACKGROUND AND SUMMARY OF THE INVENTION

Sensors can be used to measure a species in a process medium. Such sensors can be electrochemical sensors which comprise electrodes generating an electrical signal dependent on the species to be measured. The electrical signal can be a voltage or a current. If the target species is a gas, the electrodes are typically separated from the process medium by a membrane which allows the species to be measured to diffuse through it. For the use in the process and bioprocess industry, the process medium is a liquid and the membrane is enforced to make is sufficient stable for this use.

Typically, such sensors require an electrolyte between the membrane and the electrodes. The electrodes are typically arranged in a sensor shaft. Depending on the type of the sensor, the sensor shaft can comprise a different number of electrodes equal or larger than two. The sensor shaft can comprise metallic electrodes at the outside of the sensor shaft, or on the inside if the shaft provides means for ionic conductivity from and to the metallic electrode. Metallic electrodes ending in the inside of the sensor shaft can at least partially be surrounded by an inner electrolyte for this purpose.

As the membrane is, during use of the sensor, in contact with the process medium, it typically needs to be replaced more often than the sensor shaft. Also, the electrolyte which is between the membrane and the sensor shaft needs to be replaced more often than the sensor shaft to ensure reliable measurement results. Therefore, the sensors often comprise a device which is different from the sensor shaft and which comprises the electrolyte.

An example of a sensor to measure a species in a process medium is Mettler Toledo's InPro 5000i: It comprises an inner body pH electrode and a membrane body. In the wording of this document, the inner body pH electrode is an embodiment of a sensor shaft. A membrane body comprises a $CO_2$ permeable silicone membrane coated with PTFE and is filled with a liquid electrolyte before operation. In the wording of this document, the membrane body is a support cap.

This sensor can withstand the environment of the process and bioprocess industry but requires to be assembled in an orientation close to vertical and to be used in an angle of at least 15° with respect to the horizontal as otherwise, the electrolyte will flow away from the tip of the sensor shaft leaving an air-filled gap between the membrane and the sensor shaft which results in low quality measurements.

It is known, for example from the US 20 190 011 393 A1 or the EP 0 740 149 B1 to thicken the electrolyte. In some documents, such a thickened electrolyte is named "gel", although it is obvious from the context that the electrolyte is still flowable as it is the case in the U.S. Pat. No. 3,666,650 A where an aqueous solution is given as an example of a "gel". While such a thickened electrolytes can be useful for different reasons as disclosed in the cited documents, it does not give the user more freedom to choose the orientations in which the sensors can be employed.

Gel electrolytes are further known for the use of solid state sensors such as disclosed in the JP 2 512 843 B2 and the citations therein. Such sensors differ in the amount of electrolyte, their shape and their field of use significantly from sensors comprising a sensor shaft comprising electrodes. In particular, it is in general not possible for the user to exchange the membrane and the electrolyte of them.

It is therefore the technical problem to be solved to provide a sensor with an exchangeable membrane and electrolyte which can be assembled in any desired orientation as well as devices for such a sensor.

This is archived by a device and a sensor according to the independent claims.

A device for a sensor according to the invention comprises a pre-disposed gel electrolyte. The sensor which uses such a device comprises an electrolyte between a reinforced membrane and a sensor shaft. The sensor shaft comprises electrodes. Such a sensor is preferably suitable to measure a species in a process medium.

The electrolyte between the reinformed membrane and the sensor shaft is provided by the device in the form of a pre-disposed gel.

A gel, in the sense of this invention, cannot flow: If increasing pressure is applied locally, it will deform and finally break. A first part of a gel which was cut off from a second part of the gel will remain a separate part, even if the first and the second part are arranged close to each other. These properties apply preferable for the range of temperatures to which the sensor or the device can be exposed during storage and during regular use. Preferably, the gel in the sense of this invention cannot flow at temperatures below 40° C., most preferably it cannot flow at temperatures below 90° C., at atmospheric pressures and below. Preferably, if the gel according to the invention liquefies at temperatures above a threshold temperature, it jellifies again once it is cooled below this threshold temperature.

Because of its not-flowing behaviour, the gel electrolyte according to this invention remains at the desired position between the reinforced membrane and the sensor shaft independent of the orientation of the sensor. Further, it makes the handling and shipping of devices pre-disposed with an electrolyte easier: If the electrolyte would be able to flow, a correct orientation of the devices had to be ensured from the production to the installation. As this is typically not feasible, in the prior art, the user himself was instructed to fill an electrolyte, shipped in a bottle, into the volume between membrane and sensor shaft. This makes the conventional assembly challenging. Further, the use of a device with a pre-disposed gel electrolyte allows to assemble a sensor in every orientation.

It was found that thanks to the use of a reinforced membrane, by pushing the sensor shaft in direction of the reinforced membrane with the gel electrolyte arranged in between, the gel electrolyte obtains the desired shape without weaking or deforming the membrane in such a way that its lifetime or the sensor sensitivity is reduced.

In a preferred embodiment, the gel electrolyte is a non-fluid colloidal or polymer network which is expanded throughout its whole volume by a fluid with the desired electrolytic properties. This has the advantage that the user can determine the suitable composition of the electrolyte for the sensor in question with the electrolyte being a liquid. This makes the experiments faster.

Preferably, the gel electrolyte shows shear thinning and/or thixotropic behaviour. The viscosity of a shear thinning gel decreases when shear strain is applied. A thixotropic behaving gel decreases its viscosity over the time during which a shear strain is applied. Squeezing the gel electrolyte between the reinforced membrane and the sensor shaft during the insertion of the sensor shaft causes the application of shear strain. A reduction of the viscosity during this insertion allows to gel electrolyte to come in close contact with the membrane and the sensor shaft and to adapt its shape accordingly. This improves the sensitivity of the sensor and its lifetime as the pressure on the reinforced membrane is lower compared to embodiments with gels of a viscosity independent or increasing with shear strain.

In an embodiment, the device is stable against sterilization procedures. A sterilization procedure can be one of the following: Steam sterilization, autoclavation, gamma, X-ray or electron beam sterilization. The stability against sterilization procedures is obtained by the choosing a gelling agent which is stable against the desired sterilization procedure. Preferably, the gel electrolyte is created using a polysaccharide, most preferably agarose, as gelling agent or by using an adsorption-based or a polymer-based gelling agent.

Examples of polysaccharide gelling agents are agarose, cellulose, and their derivatives. Further examples of polysaccharide gelling agents are polysaccharide derivatives such as for example polyaminosaccharides like chitosan. Polyvinylpyrrolidone is another example of a polymer-based gelling agent.

Adsorption-based gelling agents are substances with a large specific surface which store a great volume of a liquid per mass unit by adsorption. Fumed silica and silica gel are examples of adsorption-based gelling agents.

Polyacrylamides, polyacryloylaminoethoxyethanol and polyglycols are examples of a polymer-based gelling agents.

In a set of experiments, it was found that adsorption-based gelling agents are stable against gamma irradiation, whereas polymer-based and polysaccharide gelling agents are suitable for heat sterilization procedures.

It was further found that amongst polysaccharides, especially agarose is a gelling agent which is also stable against gamma sterilization.

Gamma sterilization is a preferred method to sterilize single-use bioreactors, bags and bioprocess equipment in which devices according to the invention can be installed which form single-use sensor adapters. By pre-dispensing this device with a gel electrolyte produced with agarose as gelling agent, the single-use bag can be sterilized together with the mounted single-use senor adapter.

Steam sterilization is a preferred method to sterilize multi-use process industry equipment. Therefore, devices according to the invention with a gel electrolyte produced with polysaccharides or synthetic polymers as gelling agent are preferably used for sensors to be inserted in multi-use process industry equipment.

Further, it was found that some gelling agents produce a change in the pH-value of the gel during the sterilization procedure. If the sensor uses a Severinghaus measurement principle, this pH-drift can be compensated by a suitable calibration after the sterilization procedure. Preferably, however, a gelling agent is used which does not cause a change in the pH-value when subject to a given sterilization procedure. Agarose was found to be a polysaccharide gelling agent which does not change the pH value of the gel significantly when subject to gamma sterilization. Preferably, the gelling agent is chosen such that due to the sterilization procedure, the change of the pH value is less than 0.5 pH units, most preferably less than 0.3 pH units. Agarose has this property for gamma sterilization as well as for steam sterilization. Therefore, agarose is preferably used for single-use adapters for Severinghaus sensors.

A gelling agent is considered to be stable against a sterilization method if the gel before and after the sterilization is essentially the same. In the case of gamma, x-ray and electron beam sterilization, the gel continues to be a gel during the sterilization process and therefore, the orientation of the device during the sterilization can be freely selected by the user.

During steam sterilization, temperatures may rise up to 140° C., i.e., at temperatures above the threshold temperature of some of the gels according to the invention at which they liquify. Devices filled with these gels should be steam sterilized in an orientation which prevents the leaking of the gel or mounted to the sensor shaft in such a way that the sensor provides an at least temporary closed volume which prevents an undesired displacement of the liquified gel during the steam sterilization.

In a preferred embodiment, the gel electrolyte comprises a buffer for the species to be measured. Thereby the pH-value of the gel electrolyte changes proportionally to the species to be measured which can diffuse through the enforced membrane. The sensor shaft forms a pH-sensor. The reading of the sensor shaft is thereby an indicator for the partial pressure of the species to be measured. Thereby the sensor using the device is a Severinghaus sensor.

In a particularly preferred embodiment, the sensor using the device is a Severinghaus sensor to measure $CO_2$ and therefore the gel electrolyte comprises a pH buffer based on one or several bicarbonate salts. In another particularly preferred embodiment, the sensor using the device is a Severinghaus sensor to measure $NH_3$ and/or $NH_4+$ and therefore the gel electrolyte comprises a pH buffer based on one or several ammonium salts.

In another preferred embodiment, the sensor using the device is a Clark-type sensor to measure $O_2$ and/or dissolved $O_2$ and therefore the gel electrolyte comprises a solution at elevated pH based on alkaline hydroxides.

In a preferred embodiment, the device comprises a support cap. The support cap has an opening which allows the insertion of a sensor shaft in preparation for use. The support cap carries the reinforced membrane forming a barrier between a process medium and the sensor shaft which can be passed by the species during the use of the sensor. The gel electrolyte is pre-disposed in the support cap on the side of the reinforced membrane which faces the opening.

To assemble the sensor in the state of use, the user needs only to insert the sensor shaft into the device. By doing so, the gel electrolyte is deformed in such a way that it surrounds the sensitive areas of the sensor shaft while still being in contact with the reinforced membrane. The pre-disposed gel electrolyte can be located either directly on the reinforced membrane or it can be located in some distance to the membrane such that during insertion of the sensor shaft, it is moved to the reinforced membrane. Pre-disposing the gel electrolyte directly on the reinforced membrane has the advantage that the jellification can take place directly in the support cap. Pre-disposing the gel electrolyte in some distance to the membrane has the advantage that the gel electrolyte can be added to the support cap after the jellification which gives the producer more control over the jellification process.

In a preferred embodiment, a spacer mesh is arranged on top of the reinforced membrane. The spacer mesh is preferably formed by a nylon mesh. The spacer mesh defined a minimum distance between the reinforced membrane and the sensor shaft and allows thereby greater tolerances in a connection system between the support cap and the sensor shaft. The use of a spacer mesh allows further to control the distance between the membrane and the sensor shaft in an embodiment, in which a cap sleeve is used to push the support cap against the sensor shaft.

The dimensions of the support cap and the amount of pre-disposed gel electrolyte are arranged such that the gel electrolyte covers the necessary parts of the sensor shaft during use. Preferably, the amount of pre-disposed gel electrolyte is such that the support cap is essentially filled up to a line of contact between the sensor shaft and the support cap in the assembled sensor. The line of contact is preferably a limit stop for the sensor shaft and/or a sealing structure of the support cap. Most preferably, the filling level of the gel electrolyte in the assembled sensor is at room temperatures greater than 90% of the maximum filling level defined by the line of contact.

The support cap can be equipped with windows made of flexible material which allow for some thermal expansion of the gel electrolyte. Such windows are preferably present in a support cap in the form of a membrane body. A membrane body is preferably connected with the help a support cap to the sensor shaft. Preferably, in the configuration for use, a retainer is arranged between the membrane body and the sensor shaft such that the volume filled by the gel electrolyte is essentially isolated from the surrounding. This prevents the gel electrolyte from drying out and enhances the lifetime of the sensor. In addition or instead of the retainer, the support cap can be equipped with a flexible, O-ring like, sealing structure surrounding the opening. Preferably, this sealing structure is made of the same flexible material as the windows. In the assembled sensor, the sealing structure fills the gap between the support cap and the sensor shaft and defines thereby a closed volume.

Preferably, the amount of pre-disposed gel is such that the closed volume is essentially filled in the assembled sensor. If such a sensor is steam sterilized and, in this procedure, heated, the gel expands, fills thereby any remaining space in the closed volume and bulges the flexible windows. If the highest temperature reached during the steam sterilization, is above the threshold at which the gel electrolyte liquifies, the closed volume ensures that the liquified gel stays at the desired place and once the temperature drops, the restoration force of the flexible window material pushes the liquified gel during the jellification against the sensor shaft. Therefore, the steam sterilization can take place in any orientation. The same mechanism works if the sensor heats up to a temperature above the threshold due to other reasons.

In another embodiment, preferably, if the support cap is a single-use sensor adapter, it comprises two concentrically arranged cylindrical sections. The inner cylindrical section is closed by the reinforced membrane which is preferably covered by the spacer mesh. The gel electrolyte is pre-disposed in this inner cylindrical section. The diameter of the inner cylindrical section is such that the sensor shaft can be inserted in it. Thereby the gel electrolyte is displaced inside the inner cylindrical section such that the desired parts of the sensor shaft are surrounded by the gel electrolyte. In one embodiment, there is preferably no retainer and but, in the assembled sensor, a circumferential opening to the inner cylindrical section surrounding the sensor shaft which allows the gel electrolyte to expand when heated. In another embodiment, the inner cylindrical section can be equipped with a flexible, O-ring like, sealing structure surrounding the opening. Preferably, this sealing structure is made of an O-ring arranged in a circumferential recess near the top of the inner cylindrical section. In the assembled sensor, the sealing structure fills the gap between the inner cylindrical section and the sensor shaft and defines thereby a closed volume. The amount of pre-disposed gel is such that the closed volume is essentially filled in the assembled sensor. This prevents the drying-out of the gel electrolyte and enhances thereby the lifetime of the sensor.

While in some embodiment, the inner cylindrical section can be equipped with flexible windows similar to the membrane body's, such windows are omitted in other cases: As single-use sensor adapters are most commonly sterilized by irradiation with gamma beams, x-rays or electrons, they do not experience great changes in temperature during their lifetime. Therefore, means to compensate for thermal expansion, such as the flexible windows, can be omitted, resulting in an easier production process. Providing means to compensate for thermal expansion in the inner cylindrical section and a sealing structure however allows to steam sterilize the single-use sensor adaptor, too and also to expose it for other reasons to temperatures above the liquification threshold of the respective gel electrolyte.

In the following, the orientation is described by the side comprising the membrane being "below" the side comprising the opening for inserting the sensor shaft. The wording is intended purely to describe the relative positions of the different parts with respect to each other and not intended to limit the orientation of the sensor or the adapter during use or assembly.

The outer cylindrical section surrounds the inner one. The two cylindrical sections are connected in a fluid tight way at their lower end. The upper end of the outer cylindrical section towers the upper end of the inner cylindrical section and their connection is such that a hollow cylindrical volume is formed between them. This volume can hold surplus gel electrolyte if needed, although it is preferred that the pre-disposed amount of the gel electrolyte and the height of the inner cylindrical section are such that such a spilling is unlikely even in the case of high temperatures which may occur during sterilization processes.

The outer shape of the outer cylindrical section is preferably such that it can be inserted in and connected to a standard port for single-use bags such as for example a standard 1" Eldon James port. Preferably, the inner shape of the outer cylindrical section comprises a circumferential shoulder in its lower part onto which a connection part can be placed. The connection part comprises preferably a circumferential outer rim on its upper end which corresponds with the shoulder of the outer cylindrical section. The connection part comprises preferably further a shoulder on its inner surface, close to its lower end. In this embodiment, the inner cylindrical section comprises a recess on its lower, outer surface which corresponds to the shoulder of the connection part. The connection part is preferably further equipped with sealing means such as O-rings. In the assembled state, in this embodiment, the outer rim of the connection part is arranged on the shoulder of the outer cylindrical section and the recess of the inner cylindrical section is arranged on the shoulder of the connection part. It is the connecting part which connects the inner and the outer cylindrical section in a fluid tight way.

Such a modular construction of the single-use sensor adapter has the advantage that the production process can be adapted fast to changing needs of the users: The outer cylindrical section will typically remain the same for many types of sensors while the inner cylindrical section can be adapted to the users need by the choice of the membrane and the pre-disposed gel electrolyte. As different sensors may have different size sensor shafts, the diameter of the inner cylindrical section might differ and such difference can by accounted for by the dimensions of the connecting part. Depending on the expected mechanical loads on the single use sensor adapter, the inner and outer cylindrical section and the connecting part may by connected by a press fit, by an adhesive or by a thread connection.

A single-use bag according to the invention comprises a single-use sensor adapter according to the invention. This single-use bag is preferably sterilized.

This single-use bag is particular comfortable to use as the user only needs to insert the sensor shaft. The reinforced membrane of the single-use sensor adapter forms a sterile barrier between the inside of the bag and the outside. Thanks to the pre-disposed gel electrolyte, the bag can be handled and arranged without any limitation regarding the orientation of the single-use adapter. If the single-use bag is not already sterilized, the user can do so. Depending on the choice of the sterilization method and the choice of the pre-disposed gel electrolyte, the sterilization process can also take place without any limitation regarding the orientation of the single-use adapter.

Preferably, the single-use bag is sterilized by gamma irradiation and the gelling agent of the gel electrolyte is agarose.

Most preferably, the gel electrolyte comprises a bicarbonate pH buffer and the single-use sensor adapter of the single-use bag comprises a selective $CO_2$— permeable membrane forming the sterile barrier as well as part of a sensor. By inserting a sensor shaft of a Severinghaus sensor in the single-use sensor adapter, the partial pressure of $CO_2$ in the process medium kept inside the single use bag can be determined in an easy and reliable way.

In a preferred embodiment, the reinforced membrane is on one side in contact with the gel electrolyte and on the other side coated with a soluble coating. The soluble coating is preferably a polymer. The soluble coating dissolves when in contact with a fluid. Preferably, the soluble coating dissolves when in contact with the process medium.

The pre-disposed gel electrolyte can dry out if it is for a long time in contact with the surrounding air. To increase the shelf-life, it is therefore desirable to encase the gel electrolyte in a small volume which is essentially airtight. As the sensor is supposed to measure gases, the reinforced membrane is semi-permeable to at least some gases. Therefore, the gel electrolyte would be exposed to at least some components of the ambient air if membrane of the support cap would be exposed to the ambient air. One way to avoid such a direct contact is the application of a protection cap. However, a protection cap can only be used for support cap membranes which are still accessible shortly before use. For single-use sensor adapters this is typically not the case as the membrane is located inside a sterilized bag at this point in time. For other support caps, the lack of a protection cap increases the comfort for the user. Therefore, the use of a soluble coating is desirable: The soluble coating can be washed away by a rinsing fluid or by the process medium before the process to be monitored is started. It was found that a polymer, in particular Polyvinylpyrrolidone such as Povidone and Crospovidone being soluble in water, various alcohols and other solvents is a suitable choice for such a soluble coating for most process media or rinsing fluids based on any of these solvents.

In a preferred embodiment, a removable protection closes the opening of the support cap. As the sensor shaft needs to be inserted in the support cap, this end of the opening of the support cap has to be accessible. The removable protection protects on the one hand the gel electrolyte from drying out and on the other hand it stabilized and protects the support cap itself during transport and handling. Depending on the assembly of the sensor in question, the removable protection can be used to place the support cap at the desired location before insertion of the sensor shaft into it.

In a preferred embodiment, the device is a cartridge. The cartridge comprises a cylindrical support which is at least partially filled with the gel electrolyte and whereby the device and the inner circumference of the cylindric support is such that at least part of the sensor shaft can penetrate the cartridge completely along the longitudinal axis of the cylindrical support.

In this embodiment, a cartridge is used to provide the pre-disposed gel electrolyte. In contrast to the support cap, the cartridge does not comprise the semi-permeable, reinforced membrane which will be in contact with the gel electrolyte during the use of the sensor. Preferably, the cartridge is used together with an empty support cap. It is the empty support cap which provides the reinforced membrane. The empty support cap does not comprise the pre-disposed gel electrolyte. During use, the cartridge is placed in such a way relative to the empty support cap that the insertion of the sensor shaft in the support cap causes the gel electrolyte to leave the cylindrical support of the cartridge and to move to the reinforced membrane where is gets deformed in such a way that the gel electrolyte is in direct contact with at least parts of the reinforces membrane and the sensitive parts of the sensor-shaft which need to be covered by electrolyte for reliable measurements.

The dimensions of the empty support cap, the cylindrical support and the amount of pre-disposed gel electrolyte are such that the gel electrolyte covers the necessary parts of the sensor shaft during use. Preferably, the amount of pre-disposed gel electrolyte is such that the empty support cap is essentially filled up to a line of contact between the sensor shaft and the empty support cap and/or the cylindrical support arranged in the empty support cap in the assembled sensor. The line of contact is preferably a limit stop for the sensor shaft and/or a sealing structure of the empty support cap. Most preferably, the filling level of the gel electrolyte in the assembled sensor is at room temperatures greater than 90% of the maximum filling level defined by the line of contact.

Cartridges facilitate the production of the device and enables the use of a modular system to build the senor is question with the advantages of a simplified storage and adaption to the needs of the users.

Preferably, the material and inner structure of the cylindric support is such that the adherence between gel electrolyte and the cylindric support is less than the force needed to tear the gel electrolyte. Thereby the gel electrolyte can be completely pushed out of the cylindric support which facilitates to provide the desired amount of gel electrolyte. Most preferably, the adherence is below the elasticity limit of the gel electrolyte. In this case, the shape of the gel electrolyte on its way between the cartridge and its shape in the assembled sensor is known. This facilitates the insertion of the gel electrolyte. Most preferably, the cylindric support is made of a material which withstands the different sterilization procedures, which are steam sterilization or autoclavation, with temperatures above 140° C. and pressures between 100 and 105 kPa or sterilization by exposure to gamma or x-ray radiation or exposure to an electron beam.

Preferably, the cylindric support is made of Polyether ether ketone or PEEK: This material is resistant to the different sterilization procedures and the adherence between the tested gel electrolytes and it was sufficiently low to allow the gel electrolyte to be pushed out of the cylindric support completely and without permanent deformation.

In a preferred embodiment, both ends of the cylindrical support are covered by a removable and/or pierceable seal, whereby the pierceable seal can be broken by pushing the sensor shaft or the gel electrolyte against it.

Such seals protect the gel electrolyte from drying out and increase thereby the shelf-life. Further, they can prevent that the gel electrolyte slips unintentionally out of the cylindric support. A pierceable seal is convenient for the user. Preferably such pierceable seal comprises break lines along which it tears upon the pressure of the sensor shaft or the gel electrolyte. Preferably, a pierceable seal adheres to the cylindrical support. Thereby the remains for the pierceable seal are fixed to the cylindrical support during the use of the sensor while the gel electrolyte is in contact with the reinforced membrane at the sensor shaft. Removable seals are more efficient in protecting the gel electrolyte as they can be thicker and don't need any break lines. Further, they reduce the risk that parts of a seal get onto the membrane or stick to the sensor shaft which might reduce the quality of the measurement. In a preferred embodiment, seals are removable and pierceable. In this case, the sensor does work with a great likelihood if the user forgets to remove the seal.

Preferably, the seal is made out of a metal foil such as aluminum foil or a polymer foil such as HDPE, which may be metallized for improved sealing properties.

Preferably, the cartridges are provided in closed containers, for example blister packs, which protect them from drying out and soiling. In such containers, any seals might be omitted, thereby the user cannot forget to remove any seals. Preferably, however, the cartridges comprise seals in addition to being provided in closed containers, as the seals prevent the soiling in the time immediately before installation and prevent that the gel electrolyte is removed by accident from the cylindrical support.

In a preferred embodiment, at least one end of the cylindrical support is covered by a removable cartridge cap. Preferably, an upper end of the cylindrical support is covered by removable upper cartridge cap and a lower end of the cylindrical support is covered by removable lower cartridge cap. In particular, the upper and the lower cartridge cap are connected by a connector. Preferably, at least one of the cartridge caps is equipped with a lug.

Such cartridge caps protect the gel electrolyte from drying out and increase thereby the shelf-life of the cartridge. Further, they can prevent that the gel electrolyte slips unintentionally out of the cylindric support. Removable cartridge caps are efficient in protecting the gel electrolyte as their thickness and tightness of their seat on the cylindrical support can be chosen to reach the desired sealing properties. Further, they are easier to hold and to remove from the cylindrical support than removable seals. In a preferred embodiment, a pierceable seal is arranged below at least one of the cartridge caps. In this case, the protection and shelf-life of the cartridge is even more increased. Preferably, the cartridge cap comprises a cylindrical section with an inner diameter intended to receive the outer diameter of the cylindrical support. Preferably, the removable cartridge cap is made of a flexible material and the inner diameter of the cylindrical section is equal or slightly smaller than the outer material of the cylindrical support such that the restoring force of the flexible material presses the cylindrical section of the cartridge cap against the cylindrical support and forms thereby a seal. The cylindrical section of the cartridge cap is closed on one end by a preferably flat end section. A lug and a connector are preferably attached or formed from the end section.

Equipping at least one of the cartridge caps with a lug facilitates the removal of it from the cylindrical support. Preferably, the thickness of the lug is greater than the thickness of the connector.

The embodiment of an upper and a lower cartridge cap being connected by a connector has the advantage that the risk of dropping the caps after removal from the cylindrical support is lowered. Further their manufacturing is facilitated.

Preferably, the removable cartridge cap is made of a flexible polymer. Most preferably, it is made of silicone. In particular, the material of the cartridge cap has a greater flexibility than the material of the cylindrical support. Thereby, the cartridge cap can be deformed during the removal process while the cylindrical support preserves its shape. This prevents that the gel electrolyte loosens from the inside of the cylindrical support before it is supposed to do so.

Preferably, the cartridges are provided in closed containers, for example blister packs, which protect them from drying out and soiling. In such containers, any caps might be omitted, thereby the user does not to remove them. Preferably, however, the cartridges comprise cartridge caps in addition to being provided in closed containers, as the cartridge caps prevent the soiling in the time immediately before installation and prevent that the gel electrolyte is removed by accident from the cylindrical support.

In an embodiment of a cartridge the shape and the wall thickness of the cylindrical support corresponds to a step formed on the inside of an empty support cap such that the outside of the cylindrical support corresponds to the inside wall of the empty support cap above the step. Preferably, the inside of the cylindrical support corresponds to the inside wall of the empty support cap below the step or the diameter of the inside of the cylindrical support is smaller than the inside wall of the empty support cap below the step.

In this context, the orientation is described by the membrane being "below" the side the opening for inserting the sensor shaft. The wording is intended purely to describe the relative positions of the different parts with respect to each other and not intended to limit the orientation of the sensor, the device or the empty support cap with respect to the local gravitational field during use or assembly.

Using the step and the corresponding forms of the empty support cap and the cartridge as a means to place the cartridge in the sensor allows to mount the cartridge in a particular easy way as it only need to be pushed inside the empty support cap. If the empty support cap is oriented such that the opening points downwards, in the reference frame defined by the local gravitational field, the whole cartridge can be positioned by sticking the tip of the sensor shaft in the gel electrolyte. If needed and if there is a seal on the opposite side, a fingertip can be held against the opposite opening of the cylindrical support to keep the gel electrolyte inside whereby the seal prevents that the gel electrolyte sticks to the finger. If there is a seal on this opposite opening it is removed once the cartridge sticks to the tip of the sensor shaft. The sensor shaft with the cartridge on its tip is then inserted in the empty support cap. During this insertion, the cylindrical support could slide of the gel electrolyte, either along the sensor shaft or into the empty support cap. If it slides into the empty support cap and in the nominal case that the cylindrical support stays around the electrolyte gel, the cylindrical support will be stopped in its motion by the step. Latest when this happens, the insertion of the sensor shaft will remove the electrolyte gel from the cylindrical support and bring it towards the membrane where it gets deformed into its desired shape for the sensor. Typically, the sensor shaft is connected on the side opposite of its tip to a sensor head which comprises in many cases mounting structures such as threads, connectors to connect the sensor to a read-out electronic, a transmitter and/or a display and/or at least parts of the read-out electronics. The sensor head has in general a greater diameter than the sensor shaft and therefore the sensor head prevents that the cylindrical support falls off the sensor shaft. Therefore, in the assembles sensor, the cylindrical support is arranged in a volume restricted by the step on the one side and the sensor head on the other side. In other embodiments, the sensor shaft comprises a limit for the motion of the cylindrical support which is different from the sensor head. In some embodiments, the cylindrical support is used to position the sensor shaft relative to the empty support cap. In these cases, the cylindrical support touches in the assembled sensor both, the step on the empty support cap and the limit on the sensor shaft respectively the sensor head.

Arranging such a step as a part of the empty support cap ensures on the one hand that the pre-disposed gel electrolyte has a well-defined path to travel between the cartridge and the membrane. Further, by using different shapes of the inside wall of the empty support cap above the step and the correspondingly different shapes of the outside of the cylindrical support, it can be prevented that a user combines empty support caps comprising reinforced membranes with unsuitable gel electrolytes.

A sensor according to the invention is preferably a Severinghaus or Clark-type sensor. A sensor according to the invention comprises a reinforced membrane and a sensor shaft. The sensor shaft comprises electrodes. The reinforced membrane separates the process medium from the sensor shaft in such a way that the species to be measured can pass. An electrolyte fills a volume between the reinforced membrane and the sensor shaft. The sensor according to the invention characterized in that the electrolyte is a gel electrolyte.

The use of a gel electrolyte, which is an electrolyte which cannot flow at the conditions which are typically expected at such a sensor during measurement and sterilization, allows to mount the sensor in every orientation without the risk of losing electrolyte between membrane and sensor shaft.

The Clark-type sensor is preferably used to measure dissolved oxygen. The Clark-type sensor generally comprises of a platinum cathode and a silver anode which are conductively connected via a gel electrolyte. Also, other metal combinations as electrodes are possible. These electrodes are separated by an oxygen permeable membrane from the process medium. In the case of the platinum/silver electrode combination a polarization voltage of around $-800$ to $-500$ mV is applied at the platinum cathode against the silver or platinum anode. Oxygen diffuses according to its partial pressure through the membrane into the measuring chamber filled with the gel electrolyte and is reduced at the cathode to hydroxide ions (OH—). At the silver anode, silver will be oxidized and in presence of chloride the undissolvable AgCl will deposit at the electrode. In the case of a platinum anode, $OH^-$ is oxidized to $O_2$. The current is directly proportional to the partial pressure of oxygen $p(O_2)$ and this proportionality can be used to determine oxygen concentration. The sensor shaft of the Clark-type sensor comprises the cathode and the anode. In some embodiments, the sensor shaft of the Clark-type sensor comprises further electrodes, such as a reference electrode and/or guard electrodes. The support cap of the Clark-type sensor comprises the oxygen permeable membrane.

Preferably, the Clark-type sensor is used to measure another oxidizable or reduceable gas such as e.g., ozone or hydrogen, applying the same measurement principle but using a different membrane, gel electrolyte and polarization potential optimized for the gas to be measured.

The Severinghaus sensor is preferably used to measure dissolved $CO_2$. The Severinghaus principle utilizes the correlation between dissolved $CO_2$ and pH of a liquid. The potentiometric Severinghaus sensor utilizes a bicarbonate buffer system in contact with the process medium through a selective $CO_2$— permeable membrane. The bicarbonate buffer system is provided in the form of the gel electrolyte. The pH value in this buffer system is related to the partial pressure of dissolved $CO_2$ present in the process medium. The $CO_2$ from the medium diffuses across the membrane until it equilibrates within the buffer solution. A change in the $CO_2$ partial pressure results in a pH change in the electrolyte, which is detected by the inner body pH electrode, which is the sensor shaft. The inner body pH electrode is preferably a combined glass electrode consisting of a reference and measurement system. The reference system uses an inner electrolyte, also called reference electrolyte, with a ceramic diaphragm. It further comprises a reference electrode inserted in the reference electrolyte. The measurement system uses a pH-sensitive glass and an inner electrolyte which is also called an internal electrolyte. It further comprises a measurement electrode inserted in the internal electrolyte. The inner body pH electrode measures pH as a potential between a measurement electrode inserted in the measurement system and a reference electrode inserted in the reference system. The support cap of the Severinghaus sensor comprises the selective $CO_2$— permeable membrane.

Preferably, the Severinghaus sensor is used to measure other acidic or alkaline gases such as e.g., $NH_3$, applying the same measurement principle with an electrolyte and a membrane optimized for said compound, such as an ammonium-based pH buffer and a membrane permeable to $NH_3$ in the case of a Severinghaus sensor to measure $NH_3$.

A sensor to measure a species in a process medium can be assembled from a set. A set according to the invention comprises a sensor shaft, a device and a reinforced membrane. The sensor shaft comprises electrodes. The device comprises a pre-disposed gel electrolyte. The set comprises further a reinforced membrane. In some embodiments, the reinforced membrane is part of the device. In these embodiments, the device is preferably a support cap in which the gel electrolyte is pre-disposed. In other embodiments, the set comprises further an empty support cap which comprises the reinforced membrane. In these embodiments, the device is preferably a cartridge in which the gel electrolyte is pre-disposed.

A sensor according to the invention can be assembled with this set by arranging the pre-disposed gel from the device between the reinforced membrane and the sensor shaft. This is preferably done by pushing and/or deforming the pre-disposed gel with the sensor shaft while inserting the sensor shaft into the support cap, which comprises the reinforced membrane. The assembly is intuitive and comfortable and can be done in any orientation.

In a preferred embodiment of the set, the device is a cartridge. The set further comprises an empty support cap. The cartridge comprises a cylindrical support with a shape and a wall thickness. In this embodiment, a step is formed on the inside of the empty support cap. The outside of the cylindrical support of the cartridge corresponds to the inside wall of the empty support cap above the step. In a preferred embodiment, the inside of the cylindrical support of the cartridge corresponds to or has a diameter which is smaller than the inside wall of the empty support cap below the step.

In this context, the orientation is described by the membrane being "below" the side the opening for inserting the sensor shaft. The wording is intended purely to describe the relative positions of the different parts with respect to each other and not intended to limit the orientation of the sensor, the device or the empty support cap with respect to the local gravitational field during use or assembly.

The word "empty" indicates that the respective part does not comprise a pre-disposed gel electrolyte, while it may comprise other parts such as protections and/or functional parts, such as for example in the case of the empty single-use adapter, the empty support cap and in the case of the empty support cap a spacer mesh and/or a sealing structure.

Providing the pre-disposed gel in a cartridge increases the shelf-life of the part comprising the empty support cap and allows the user to adapt the sensor to particular needs by choosing between different electrolytes. In a particular preferred embodiment, the set comprising the empty support cap comprises further a single-use bag to which an empty single-use sensor adapter is mounted. The empty single-use sensor adapter is the embodiment of the empty support cap used in this case.

Preferably, the single-use bag to which the empty single-use sensor adapter is mounted is sterilized.

This set is particularly comfortable to use as the user only needs to insert the sensor shaft and the cartridge. The reinforced membrane of the empty single-use sensor adapter forms a sterile barrier between the inside of the bag and the outside. Thanks to the pre-disposed gel electrolyte in a cartridge, the bag can be handled and arranged without any limitation regarding the orientation of the single-use adapter. If the single-use bag is not already sterilized, the user can do so.

Preferably, the single-use bag is sterilized by gamma irradiation and the gelling agent of the gel electrolyte is agarose.

Most preferably, the gel electrolyte comprises a $CO_2$-buffer and the single-use sensor adapter of the single-use bag comprises a selective $CO_2$-permeable membrane forming the sterile barrier as well as part of a sensor. By inserting a sensor shaft of a Severinghaus sensor in the single-use sensor adapter, the partial pressure of $CO_2$ in the process medium kept inside the single use bag can be determined in an easy and reliable way.

A preferred set according to the invention comprises a sensor shaft comprising electrodes suitable to determine a pH-value of a medium surrounding the sensor shaft and a device comprising a pre-disposed gel electrolyte. The gel electrolyte comprises a buffer for the species to be measured.

This preferred set is suitable assemble a Severinghaus sensor to measure the partial pressure of dissolved gases, such as $CO_2$. Such measurements provide high resolution at low $CO_2$ partial pressures as common in bioprocessing applications.

The method to produce a device according to the invention comprises the steps of preparing an electrolyte with a gelling agent and dispensing said electrolyte into said support cap or cylindrical support to jellify in-situ. Alternatively, the liquid electrolyte is dispensed into said support cap or cylindrical support, followed by the addition of a gelling agent to jellify the electrolyte in-situ.

Letting the electrolyte jellify in-situ ensures that the shape of the resulting gel electrolyte corresponds to the internal shape of the support cap respectively the cylindrical support. This close correspondence in the shapes minimizes the air bubbles trapped between gel electrolyte and the support cap respectively the cylindrical support which increases the shelf-life. Further, the resulting gel electrolyte does not simply fall out of the support cap respectively the cylindrical support even though the materials are preferably not adhesively bound to each other.

The method to produce a device according to the invention comprises preferably further the step of applying a removable or pierceable seal onto the electrolyte gel. In some embodiments, the seal in the form of a foil is simply placed onto the nearly completely jellified gel such that the seal sticks on the gel electrolyte due to surface forces. In other embodiments, a soluble adhesive is used to stick the seal in the form of a foil onto the electrolyte-gel. In still other embodiments, the seal is formed by a coating, which can be a soluble coating. In some embodiments, the seal is applied in such a way that it adheres to the support cap or cylindrical support surrounding the gel electrolyte. The seal can be made out of a metal foil such as aluminium foil or a polymer foil such as HDPE, which may be metallized for improved sealing properties.

The method to produce a device according to the invention comprises preferably further the step of closing the opening of the support cap or at least one end of the cylindrical support with a removable protection. The removable protection is preferably made of an elastic plastic. The strep of closing the support cap or the cylindrical support comprises preferably the tasks of pushing the removable protection onto the part in question. The user can remove the removable protection in this case by simply pulling it off.

Preferably, the seal and/or the removable protection are applied after the gel electrolyte has jellified. Thereby, the shape of the gel electrolyte is not changed by accident by these steps.

The method to produce a device in the form of a cartridge comprises preferably the step of placing the cylindrical support onto a material suitable to form a seal before dispensing said electrolyte with a gelling agent into the cylindrical support.

Preferably the material suitable to form a seal is an aluminium foil or a polymer foil, such as HDPE or metallized HDPE.

This embodiment has the advantage that a material suitable to form a seal is used to close the mould formed by the cylindrical support during the production of the cartridge as well as a seal for the finished cartridge. Therefore, the production is facilitated.

In another embodiment, the method to produce a device in the form of a cartridge comprises preferably the step of placing the cylindrical support onto a material suitable to form a seal before dispensing the liquid electrolyte followed by a gelling agent into the cylindrical support.

The method to produce a device in the form of a cartridge comprises preferably the step of placing a cartridge cap on one end of the cylindrical support before dispensing said electrolyte with a gelling agent into the cylindrical support or before dispensing the liquid electrolyte followed by a gelling agent into the cylindrical support.

Preferably the material of the cartridge cap is silicone.

This embodiment has the advantage that the cartridge cap is used to close the mould formed by the cylindrical support during the production of the cartridge as well as to seal the gel electrolyte of the finished cartridge from the surrounding. Therefore, the production is facilitated.

Preferably the cartridge cap placed on the one end of the cylindrical support before dispending the electrolyte into the cylindrical support is a lower cartridge cap placed on a lower end of the cylindrical support and the method to produce the devices is followed by a step of placing an upper cartridge cap on the upper end of the cylindrical support. Thereby, the upper cartridge cap is preferably attached to the lower cartridge cap with a flexible connection.

In another method to produce a device in the form of a cartridge, a cylindrical support filled with a gel electrolyte is provided and cartridge caps are placed on both of its ends.

The method to produce a device in the form of a support cap comprises preferably the step of applying the soluble coating onto the reinforced membrane. The soluble coating is preferably applied on the side of the membrane facing the process medium to be measured. The reinforced membrane is fluid tight. Therefore, the soluble coating can be applied by any common method to apply a liquid coating such as dipping or spraying. Once the soluble coating has fully dried, it can be covered by a protection cap to avoid an undesired contact with a liquid or mechanical damage. In the case of a single-use sensor adaptor mounted to a single-use bag, such a protection cap is not needed as the bag itself has the protection function.

A method to produce a sensor comprises the steps of mounting a support cap onto a sensor shaft. In one embodiment, the support cap comprises either a pre-disposed gel electrolyte. In another embodiment, the support cap is an empty support cap comprising a step onto which a cartridge is placed. If there are any removable seals, removable cartridge caps or removable protections respectively protection caps on the support cap or the cartridge, they are removed before the mounting on the support cap onto the sensor shaft. Due to the pressure of the senor shaft during the insertion into the support cap, the gel electrolyte is equally distributed between the support cap and the sensor shaft.

In a preferred embodiment of a method to produce a sensor, the cartridge is placed onto a sensor shaft tip. The sensor shaft is inserted, with the cartridge on its tip, into the support cap comprising a step. During the insertion, the cylindrical support of the cartridge contacts the step and the gel electrolyte is pushed out of it due to the motion of the sensor shaft. The gel electrolyte is pushed, by the sensor shaft, against the reinforced membrane and thereby deformed and equally distributed between the support cap and the sensor shaft.

BRIEF DESCRIPTION OF THE DRAWINGS

The following figures illustrate the invention:

FIG. 1A sensor according to the invention;

FIG. 2a A support cap;

FIG. 2b A single-use sensor adapter;

FIG. 3a An empty support cap;

FIG. 3b An empty single-use sensor adapter;

FIG. 3c A cartridge to be used with the empty support cap of FIG. 3a;

FIG. 4A single use bag with a single-use sensor adapter;

DETAILED DESCRIPTION OF EXEMPLARY EMBODIMENT(S)

Figures 1, 2A, 2B, 3A, 3B, 3C:
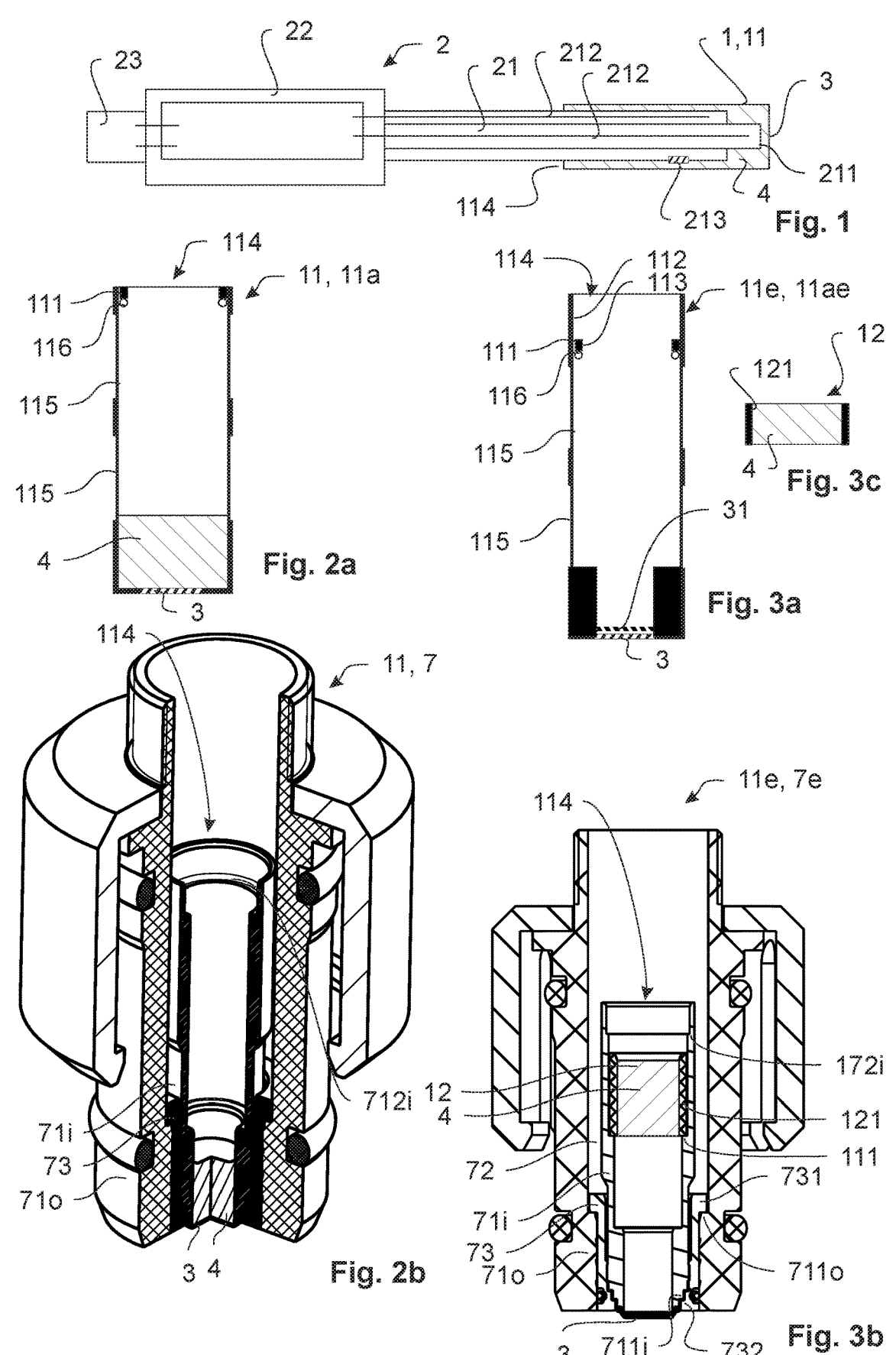

FIG. 1 depicts a sensor 2 according to the invention. It comprises a sensor head 22 which receives the electrodes 212 and connects them to an interface for data transmission 23, for example a plug for a data cable. The sensor 2 comprises further a sensor shaft 21. Two electrodes 212 extend from the sensor head 22 into or along the sensor shaft 21. In the example depicted in FIG. 1, the electrodes 212 extend into the sensor shaft 21 and are surrounded by an inner electrolyte. In the depicted embodiment, the sensor shaft 21 comprises two coaxially arranged chambers. An electrode 212 is arranged in every one of them. The inner chamber extends further away from the sensor head 22 and ends in a sensor shaft tip 211 which is at least partially formed by a pH-glass. The inner chamber with its electrode 212, its inner electrolyte, also called internal electrolyte, and its pH-glass is also called measurement system. The outer chamber comprises a diaphragm 213. The outer chamber with its electrode 212, its inner electrolyte, also called reference electrolyte, and its diaphragm 213 is also called reference system. The sensor shaft tip 211 and part of the sensor shaft 21 are arranged inside a device 1 in the form of a support cap 11. The support cap 11 has a cylindrical shape with one end forming an opening 114 and a reinforced membrane 3 on the other end. The device 1 is filled with a gel electrolyte 4 such that the gel electrolyte 4 connects the membrane 3, the pH-glass on the sensor shaft tip 211 and the diaphragm 213. The illustrated sensor 2 works according to the Severinghaus principle: Thereby, the gel electrolyte 4 comprises a buffer suitable to be species to be measured. The species to be measured diffuses through the reinforced membrane 3 and reacts with the buffer such that the pH value of the gel electrolyte 4 changes. The potential of the measurement system depends on the pH value of the gel electrolyte 4 with which it is in contact, measured against the reference system. The electrical connection between the gel electrolyte 4 and the electrode 212 of the reference system is established through the diaphragm 213 and the reference electrolyte. The gel state of the gel electrolyte 4 allows the sensor 2 according to the invention to be assembled in any orientation as the gel electrolyte 4 cannot flow away and thereby interrupt the connection between membrane 3, sensor shaft tip 211 and diaphragm 213.

In other types of sensors 2 comprising electrodes 212, such as Clark-type sensors, the sections of the sensor shaft 21 which need to be covered by the gel electrolyte 4 can be different. For example, the electrodes 212 can be directly exposed to the gel electrolyte 4. In any case, the gel state allows to ensure the necessary connection.

FIG. 2a shows a support cap 11 in the form of a membrane body 11a. Such a membrane body 11a is intended to be used on a multi-use sensor 2. Most of its outer surface is during use protected by a cap sleeve leaving only the reinforced membrane 3 exposed to the process medium to be analysed. The membrane body 11a consists of a cylindrical part which comprises on the one side an opening 114 and on the other side the reinforced membrane 3. It is partially filled with the gel electrolyte 4. The filling level of the gel electrolyte 4 is such that once the sensor shaft 21 is inserted, the gel electrolyte 4 fills essentially the entire remaining volume of the membrane body 11*a* below a support cap sealing structure 116. The cylindrical part comprises a set of windows 115 covered with elastic material. As a part of a multi-use sensor 2, the membrane body 11*a* can be subject to steam sterilization processes during which the gel electrolyte 4 is exposed to temperatures of 120° C. or 140° C. Thereby it expands. This causes the windows 115 to bulge to the outside. During cooling, the elasticity of the window material pushes the gel electrolyte 4 back against the sensor shaft 21, keeping the sensor 2 in a functional state. The step 111 surrounding the opening 114 of the membrane body 11*a* can be used as a limit stop to prevent a corresponding sensor shaft 21 to be inserted too far. Further, the step 111 as well as the optional support cap sealing structure 116 reduce the surface of the gel electrolyte 4 exposed to the surrounding in the assembled sensor 2 which prevents the drying out of the gel electrolyte 4 and enhances thereby the sensors 2 lifetime.

FIG. 3*a* shows an empty support cap 11*e* in the form of an empty membrane body 11*ae*. Its shape and parts are similar to the one shown in FIG. 2*a*, however, it is not pre-disposed with the gel electrolyte 4. Further, the step 111 is arranged such that the inside wall of the empty support cap 112 continues above it. The step 111 acts as a limit stop for a corresponding cartridge 12, such as depicted in FIG. 3*c*. The step 111 formed on the inside of the empty support cap 11*e* is such that the outside of the cylindrical support 121 of the cartridge 12 corresponds to the inside wall of the empty support cap above the step 112 while the inside of the cylindrical support 121 of the cartridge 12 corresponds to the inside wall of the empty support cap below the step 113. In this way, the limit stop acts only on the cylindrical support 121 but not on the pre-disposed gel 4, which can be pushed against the reinforced membrane 3. In such an embodiment, the exposed end of the cylindrical support 121 of the cartridge 12 can act as a limit stop for the sensor shaft 21 to be inserted into the combination of the empty membrane body 11*ae* and the cartridge 12. Another or additional way to ensure a minimum distance between the sensor shaft tip 211 and the reinforced membrane 3 is a spacer mesh 31 arranged on top of the reinforced membrane 3. The spacer mesh 31 is made of a material which does not damage the sensor shaft tip 211 and which does not damage the reinforced membrane 3. For example, it can be made of Nylon. Being a mesh, it allows the gel electrolyte 4 to establish the desired contacts. In the embodiment shown in FIG. 3*a*, the shape on the inside of the empty membrane body 11*ae* is further altered with respect to the one depicted in FIG. 2*a* to limit the internal volume. This allows to reduce the amount of gel electrolyte 4 which is needed.

FIG. 3*c* shows a cartridge 12 to be used with an empty support cap 11*e* as shown in FIG. 3*a*. It comprises a cylindrical support 121 filled with a gel electrolyte 4. The inner circumference of the cylindrical support 121 and the shape of the cartridge 12 is such that the sensor shaft 21 up to an optional limit stop fits through it completely along the longitudinal axis of the cylindrical support 121. This allows that the gel electrolyte 4 can be pushed out of the cylindrical support 121 by the sensor shaft 21. The inner and outer shape of the cylindrical support 121 is such that it corresponds with empty support cap 11*e* with which it should interact.

FIGS. 2*b* and 3*b* show a support cap 11 is the form of a single-use sensor adapter 7 and an empty support cap 11*e* in the form of an empty single-use sensor adapter 7*e* with an inserted cartridge 12. In the shown embodiments, the single-use sensor adapter 7 and the empty single-use sensor adapter 7*e* show many common features. They are explained with respect to the empty single-use sensor adapter 7*e* shown in FIG. 3*b* but apply analogously to the single-use sensor adapter 7 of FIG. 2*b*.

The empty single-use sensor adapter 7*e* comprises two concentrically arranged cylindrical sections 71*i*, 71*o*. The inner cylindrical section 71*i* is closed by the reinforced membrane 3. The diameter of the inner cylindrical section 71*i* is such that the sensor shaft 21 can be inserted in it.

The outer cylindrical section 71*o* surrounds the inner one 71*i*. The two cylindrical sections 71*i* and 71*o* are connected in a fluid tight way at their lower end. The upper end of the outer cylindrical section 71*o* towers the upper end of the inner cylindrical section 71*i* and their connection is such that a hollow cylindrical volume 72 is formed between them. This volume 72 can hold surplus gel electrolyte, if needed although it is preferred that the pre-disposed amount of the gel electrolyte and the height of the inner cylindrical section 71*i* are such, that such a spilling is unlikely even in the case of high temperatures which may occur during sterilization processes.

The outer shape of the outer cylindrical section 71*o* is such that it can be inserted in and connected to a standard 1" Eldon James port. The inner shape of the outer cylindrical section 71*o* comprises a circumferential shoulder 711*o* in its lower part onto which the connection part 73 can be placed. The connection part 73 comprises preferably a circumferential outer rim 731 on its upper end which corresponds with the shoulder 711*o* of the outer cylindrical section. The connection part 73 comprises preferably further a shoulder 732 on its inner surface, close to its lower end. In this embodiment, the inner cylindrical section 71*i* comprises a recess 711*i* on its lower, outer surface which corresponds to the shoulder 732 of the connection part 73. The connection part 73 is equipped with sealing means such as O-rings. In the assembled state, as shown, the outer rim 731 of the connection part 73 is arranged on the shoulder 711*o* of the outer cylindrical section 71*o* and the recess 711*i* of the inner cylindrical section 71*i* is arranged on the shoulder 732 of the connection part 73. It is the connecting part 73 which connects the inner and the outer cylindrical section 71*i*, 71*o* in a fluid tight way.

In the case of the single-use sensor adapter 7 depicted in FIG. 2*b*, the gel electrolyte 4 is pre-disposed inside the inner cylindrical section 71*i* on the reinforced membrane 3. The amount of pre-disposed gel electrolyte 4 is such that once the sensor shaft is 21 completely inserted, whereby a sensor is formed, the gel electrolyte 4 fills the inner cylindrical section 71*i* at room temperatures essentially completely, preferably to more than 90%, of a desired filling level. In the case shown in FIG. 2*b* the desired filling level is defined by a limit stop for the sensor shaft 712*i*, formed as a circumferential step on the inside of the inner cylindrical section 71*i* close to the opening 114.

In the case of the empty single-use sensor adapter 7*e* depicted in FIG. 3*b*, the gel electrolyte 4 is pre-disposed inside the cylindrical support 121 of the cartridge 12. To receive the cartridge 12, the inner cylindrical section 71*i* comprises a step 111 close to its opening 114. In the embodiment shown in FIG. 3*b*, the outside of the cylindrical support 121 corresponds to the inside wall of the inner cylindrical section 71*i*, being a part of the empty support cap 11*e*, above the step 111. However, the inside of the cylindrical support 121 has a smaller diameter than the inside wall of the inner cylindrical section 71*i* below the step 111.

The amount of pre-disposed gel electrolyte 4 is such that once the sensor shaft is 21 completely inserted, whereby a sensor is formed, the gel electrolyte 4 fills the inner cylindrical section 71i at room temperatures essentially completely, preferably to more than 90%, of a desired filling level. In the case shown in FIG. 2b the desired filling level is defined by a limit stop for the sensor shaft 712i, formed as a circumferential step on the inside of the inner cylindrical section 71i close to the opening 114.

Figures 4, 5A, 5B, 5C, 5D:
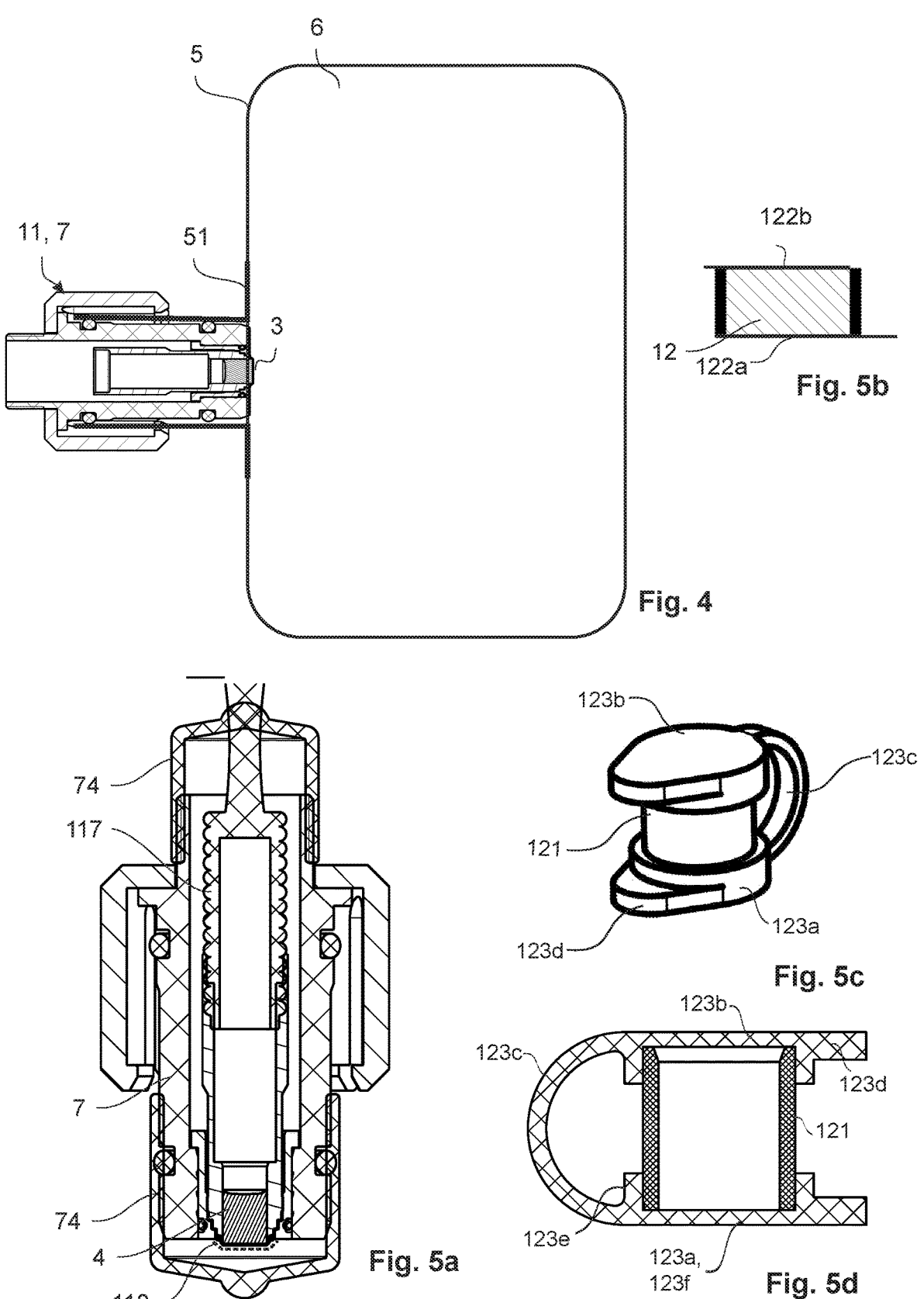
FIG. 5a The support cap of FIG. 2a with removable protections and a soluble coating.
FIG. 5b The cartridge with a removable and a pierceable seal.
FIG. 5c The cartridge with an upper and a lower cartridge cap.
FIG. 5d A cross section of the cartridge of FIG. 5c.

FIG. 4 illustrates a single-use bag 5. It comprises a port 51 to which a single-use sensor adapter 7 is attached. The single-use bag 5 is filled with the process medium 6, a species of which should be measured. The reinforced membrane 3 is on one side in contact with the process medium 6 and on its other side with the pre-disposed gel electrolyte 4. The gel state of the gel electrolyte 4 keeps it at the reinforced membrane 3 even though the single-use sensor adapter 7 is mounted horizontally.

FIGS. 5a and 5b illustrate how the pre-disposed electrolyte gel 4 can be protected from drying out and soiling during shipping and storage.

FIG. 5a depicts the single-use sensor adapter 7 explained in detail with respect to FIG. 2b. The single-use sensor adapter 7 comprises the pre-disposed gel electrolyte 4 on the reinforced membrane 3 inside the inner cylindrical section. In this embodiment, a soluble coating 118 made of Polyvinylpyrrolidone is applied to the outside of the reinforced membrane 3. Further, a removable protection 117 is pushed into the opening 114 of the inner cylindrical section. The removable protection 117 is made of an elastic plastic. It has the cylindrical section which transforms into a handle on one side and is open on the other side. The cylindrical part is equipped with a profile of circumferential rips. The dimensions of the cylindrical part of the removable protection 117 is such that it can be inserted into the inner cylindrical section in such a way that the rips form an airtight barrier to the environment. Thereby, the volume in which this gel electrolyte 4 is located is closed by the soluble coating 118, the removable protection 117 and the inner cylindrical section of the single-use sensor adapter 7. This minimized rate of drying of the gel electrolyte 4.

To prevent soiling and mechanical damages as well as an accidental removal of either the soluble coating 118 or the removable protection 117, the single-use sensor adapter 7 can be equipped with further protection caps 74.

FIG. 5b illustrates the way the pre-disposed electrolyte gel 4 of a cartridge 12 can be protected: There is a removable seal 122a made of aluminum foil in the show embodiment attached to one side of the cartridge 12. On the other side, there is a pierceable seal 122b. In the shown embodiment, the pierceable seal 122b is also made out of aluminum foil. However, the foil is significantly thinner than its nominal value along most of the cylindrical support 121. Such a thin section is seen on the right side in FIG. 5b. In one section the foil has its nominal thickness. This is shown on the left in FIG. 5b. The foil forming the pierceable seal extends in its nominal thickness above the cylindrical support 121. If a user would like to remove this seal 122b, too, he can do so by grabbing this extension. If, however, he does not want to remove it or forget it, and pushes with the sensor shaft tip 211 against it, the seal 122b ruptures where it is particularly thin while the attachment of it to the cylindrical support 121 ensures that the remains of the seal 122b stay in the proximity of the cylindrical support 121 and do not interfere with the measurement.

FIGS. 5c and 5d illustrate another way the pre-disposed electrolyte gel 4 of a cartridge 12 can be protected: An upper cartridge cap 123b is place onto an upper end of the cylindrical support 121 and a lower cartridge cap 123a is place to a lower end of the cylindrical support 121. FIG. 5d shows a cross section of the iso-view visible in FIG. 5c.

Both cartridge caps 123a, b are formed analogously. Each cartridge cap 123a, b comprises a cylindrical section 123e with an inner diameter intended to receive the outer diameter of the cylindrical support 121. The cartridge cap 123a, b is made of silicone which is more flexible than the PEEK of which the cylindrical support 121 is made in this example. The inner diameter of the cylindrical section is equal to or slightly smaller than the outer material of the cylindrical support 121 such that the restoring force of the flexible material presses the cylindrical section 123e of the cartridge cap 123a,b against the cylindrical support 121 and forms thereby a seal. The cylindrical section 123e of the cartridge cap is closed on one end by a flat end section 123f. A lug 123d and a connector 123c are attached to this end section 123f. The connector 123c connects the upper and the lower cartridge caps 123a, 132b. It has in the illustrated embodiment the shape of a flat silicone band. The thickness of the material of the lug 123d is about twice the thickness of the end section 123f and the connector 123c. Thereby, the lug 123d is less flexible than the end section 123f and the connector 123c and therefore suitable to transfer forces to the end section 123f effectively. By pulling on the lug 123d, the cartridge cap 123a,b can be easily removed from the cylindrical support 121.

One way to produce a gel electrolyte 4 is as follows: Aqueous electrolyte solution is heated above the melting temperature of agarose. 1 to 4% by weight of agarose are added and the mixture is stirred until it is clear. The desired amount of electrolyte is dispensed into an empty single-use sensor adapter, an empty membrane body, another empty support cap or a cylindrical support. The gel formation occurs upon cooling to a room temperature of 20° C.

One way to produce a gel electrolyte 4 for a Severinghaus sensor to measure $CO_2$, is as follows: Aqueous electrolyte solution is heated above the melting temperature of agarose. 1 to 4% by weight of agarose are added and the mixture is stirred until it is clear. It is cooled to 60-70° C. Bicarbonate salts are added at this temperature. The desired amount of electrolyte is dispensed into an empty single-use sensor adapter, an empty membrane body, another empty support cap or a cylindrical support. The gel formation occurs upon cooling to a room temperature of 20° C.

REFERENCE SIGNS LIST

1 Device
2 Sensor
3 reinforced membrane
31 Spacer mesh
21 sensor shaft
211 sensor shaft tip
212 Electrodes
22 Sensor head
23 Interface for data transmission
4 gel electrolyte
11 support cap
11e empty support cap
111 step
112 inside wall of the empty support cap above the step
113 inside wall of the empty support cap below the step
114 opening
115 window
116 Support cap sealing structure 11a membrane body
11ae Empty membrane body
7 single-use sensor adapter
7e empty single-use sensor adapter
71i inner cylindrical section
711i recess
712i Limit stop for sensor shaft
71o outer cylindrical section
711o shoulder
72 volume
73 connection part
731 outer rim
732 shoulder
74 protection cap
5 single-use bag
51 port
118 soluble coating
117 removable protection (opening side)
12 cartridge
121 cylindrical support
122a,b Seal (removable, pierceable)
123a,b, cartridge cap (lower and upper)
123c flexible connection
123d lug
123e cylindrical section
123f end section
6 process medium

What is claimed is:

1. A device for measuring a species in a process medium, said device comprising:
a sensor:
a reinforced membrane;
a sensor shaft comprising electrodes;
a gel electrolyte; and
a support cap with an opening configured to permit insertion of the sensor shaft in preparation for use and which carries the reinforced membrane to form a barrier between the process medium and the sensor shaft, wherein the reinforced membrane is passable by the species during the use of the sensor, wherein the gel electrolyte is pre-disposed in the support cap on a side of the reinforced membrane which faces the opening, and wherein the support cap is:
a membrane body attachable to the sensor shaft; of
a single-use sensor adapter configured to be mounted to a single-use bag and which is attachable to the sensor shaft.

2. The device of claim 1 wherein:
the gel electrolyte is a non-fluid colloidal or polymer network which is expanded throughout its whole volume by a fluid with desired electrolytic properties; and
the gel electrolyte exhibits shear thinning and/or thixotropic behaviour.

3. The device of claim 1 wherein:
said gel electrolyte comprises a gelling agent that is stable against sterilization procedures comprising steam sterilization, autoclavation, gamma, x-ray or electron beam sterilization;
the device is stable against said sterilization procedures; and
the gel electrolyte is formed using:
a polysaccharide as a gelling agent; or
an adsorption based or a polymer-based gelling agent.

4. The device of claim 1 wherein:
the gel electrolyte comprises a buffer for the species to be measured.

5. The device of claim 1 wherein:
the reinforced membrane is in contact with the gel electrolyte on a first side of the reinforced membrane and coated with a soluble coating on a second side of the reinforced membrane;
said coating is configured to dissolve when in contact with a fluid.

6. The device of claim 1 wherein:
the device is a cartridge, said cartridge comprises a cylindrical support which is at least partially filled with the gel electrolyte; and
at least part of the sensor shaft fits through the device and an inner circumference of the cylindrical support completely along a longitudinal axis of the cylindrical support.

7. The device of claim 6 wherein:
a shape and a wall thickness of the cylindrical support corresponds to a step formed on an inside of the support cap such that an outside of the cylindrical support corresponds to an inside wall of the support cap above the step.

8. A single-use bag comprising the device of claim 1, wherein the support cap is the single-use sensor adapter.

9. The single-use bag of claim 8 wherein:
the single-use bag is sterilized.

10. A set for measuring a species in a process medium, said set comprising:
the device of claim 1,
wherein the reinforced membrane is
part of the support cap, which is part of the set.

11. The set of claim 10 wherein:
the device is a cartridge, said cartridge comprises a cylindrical support which is at least partially filled with the gel electrolyte;
at least part of the sensor shaft fits through the device and an inner circumference of the cylindrical support completely along a longitudinal axis of the cylindrical support, wherein a shape and a wall thickness of the cylindrical support corresponds to a step formed on an inside of the support cap such that an outside of the cylindrical support corresponds to an inside wall of the support cap above the step; and
the outside of the cylindrical support of the cartridge corresponds to the inside wall of the support cap above the step.

12. The set of claim 11 further comprising:
a single-use bag to which the support cap in the form of an empty single-use sensor adapter is mounted.

13. The set of claim 10 wherein:
at least some of the electrodes of the sensor shaft are configured to determine a pH-value of a medium surrounding the sensor shaft; and
the pre-disposed gel electrolyte of the device comprises a buffer for the species to be measured.

14. A method for producing the device of claim 1, said method comprising the steps:
of preparing the electrolyte with a gelling agent; and
dispensing:
said electrolyte into the support cap to jellify in-situ; or
a liquid electrolyte into said support cap followed by the addition of a gelling agent to jellify the electrolyte in-situ.

15. A set for a sensor for measuring a species in a process medium, said set comprising:

a sensor shaft comprising electrodes; and a device for a sensor configured to measure a species in a process medium, said device comprising:

a reinforced membrane;

a sensor shaft comprising electrodes; and a gel electrolyte pre-disposed at the device;

wherein the reinforced membrane is:

part of the device; or part of an empty support cap, which is part of the set;

wherein at least some of the electrodes of the sensor shaft are configured to determine a pH-value of a medium surrounding the sensor shaft; and wherein the pre-disposed gel electrolyte of the device comprises a buffer for the species to be measured.

16. A cartridge device for a sensor configured to measure a species in a process medium, said cartridge device comprising:

a reinforced membrane;

a sensor shaft comprising electrodes;

a gel electrolyte; and a cylindrical support which is at least partially filled with the gel electrolyte and thereby the gel electrolyte is pre-disposed at the device;

wherein at least part of the sensor shaft fits through the device and an inner circumference of the cylindrical support completely along a longitudinal axis of the cylindrical support.

*  *  *  *  *